US012803199B2

(12) United States Patent
Tsorng et al.

(10) Patent No.: US 12,803,199 B2
(45) Date of Patent: Nov. 17, 2026

(54) LOCKING DEVICE FOR CABLE ASSEMBLY

(71) Applicant: Quanta Computer Inc., Taoyuan City (TW)

(72) Inventors: Yaw-Tzorng Tsorng, Taoyuan City (TW); Jen-Jia Liou, Taoyuan City (TW); Wei-Jie Chen, Taoyuan City (TW); Zuo-Jun Yin, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 392 days.

(21) Appl. No.: 18/638,452

(22) Filed: Apr. 17, 2024

(65) Prior Publication Data

US 2025/0329951 A1 Oct. 23, 2025

(51) Int. Cl.
*H01R 12/77* (2011.01)
*H01R 12/79* (2011.01)

(52) U.S. Cl.
CPC .......... *H01R 12/774* (2013.01); *H01R 12/79* (2013.01)

(58) Field of Classification Search
CPC .............................. H01R 12/79; H01R 12/774
See application file for complete search history.

(56) References Cited

U.S. PATENT DOCUMENTS 4,009,921 A * 3/1977 Narozny ................ H01R 12/79 439/573
4,068,912 A * 1/1978 Hudson, Jr. .......... H01R 12/675 29/857
4,188,083 A * 2/1980 Knowles ............. H01R 12/675 439/406
5,122,079 A * 6/1992 Locati ................. H01R 12/675 439/417

(Continued)

FOREIGN PATENT DOCUMENTS

CN 208240887 U 12/2018
CN 107768913 B 6/2021
CN 220774785 U 4/2024

(Continued)

OTHER PUBLICATIONS

TW Office Action for Application No. 113119269 mailed Feb. 8, 2025, w/ First Office Action Summary, 5 pp.

(Continued)

*Primary Examiner* — Phuong K Dinh
(74) *Attorney, Agent, or Firm* — Nixon Peabody LLP

(57) ABSTRACT

A locking device for securing a cable assembly to a cable connector of a printed circuit board (PCB) includes a clamp member and a frame. The clamp member includes a baseplate and at least one arm extending from the baseplate that has a clamp locking feature. The frame is configured to fit over the clamp member and includes at least one latching member extending therefrom that has a frame locking feature. When the frame is fit over the clamp member, the at (Continued)

least one arm of the baseplate extends through an aperture defined in the frame such that the at least one arm is parallel to the at least one latching member of the frame. The clamp locking feature of the at least one arm is configured to mate with the frame locking feature of the at least one latching member to lock the frame to the clamp member.

22 Claims, 11 Drawing Sheets

(56) References Cited

U.S. PATENT DOCUMENTS

| | | | | |
|---|---|---|---|---|
| 6,383,004 | B1 * | 5/2002 | Gunay | H01R 12/61 439/329 |
| 2023/0083572 | A1 * | 3/2023 | Hibino | H01R 13/5202 439/589 |

FOREIGN PATENT DOCUMENTS

| | | | |
|---|---|---|---|
| JP | 2015170579 | A | 9/2015 |
| JP | 2017216103 | A | 12/2017 |
| TW | M335047 | U | 6/2008 |
| TW | 202312588 | A | 3/2023 |

OTHER PUBLICATIONS

TW Search Report for Application No. 113119269 mailed Feb. 8, 2025, w/ First Office Action, 1 p.

* cited by examiner

LOCKING DEVICE FOR CABLE ASSEMBLY

FIELD OF THE INVENTION

The present disclosure relates generally to a device for securing a cable assembly connected to a printed circuit board, and more specifically, to a device for securing a cable assembly to a printed circuit board that is adjustable for different sizes of components.

BACKGROUND OF THE INVENTION

Printed circuit boards (e.g., motherboards, daughterboards, etc.) in computing devices and systems often include connectors mounted thereon into which the plug of a cable assembly can be inserted. The plug is designed to mechanically fit into and/or around the cable connector, in order to electrically connect the cables of the cable assembly to various other components mounted on the board. However, these cable assemblies are often not designed to be locked to the cable connector or otherwise secured in any way, such that the plug can inadvertently become disconnected from the cable connector. Thus, new devices are needed for securing a cable assembly to a cable connector of a printed circuit board.

SUMMARY OF THE INVENTION

The term embodiment and like terms, e.g., implementation, configuration, aspect, example, and option, are intended to refer broadly to all the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In a first implementations, the present disclosure is directed to a locking device for securing a cable assembly to a cable connector of a printed circuit board (PCB). The locking device includes a clamp member and a frame. The clamp member includes a baseplate and at least one arm extending from the baseplate. The at least one arm has a clamp locking feature. The frame is configured to fit over the clamp member and includes at least one latching member extending therefrom. The at least one latching member has a frame locking feature. When the frame is fit over the clamp member, the at least one arm of the baseplate extends through an aperture defined in the frame such that the at least one arm is parallel to the at least one latching member of the frame. The clamp locking feature of the at least one arm is configured to mate with the frame locking feature of the at least one latching member to lock the frame to the clamp member.

In some aspects of the first implementation, when the frame is locked to the clamp member, a gap is defined between the frame and the baseplate of the clamp member.

The gap is sized to receive a portion of the cable assembly and a portion of the cable connector therein.

In some aspects of the first implementation, the clamp member and the frame apply a compressive force to the portion of the cable assembly and the portion of the cable connector when the frame is locked to the clamp member. The compressive force prevents disconnection of the cable assembly from the cable connector.

In some aspects of the first implementation, the frame further includes a compression member extending from an underside thereof. The compression member and the clamp member apply the compressive force to the portion of the cable assembly and the portion of the cable connector when the frame is locked to the clamp member.

In some aspects of the first implementation, the clamp locking feature includes one or more grooves defined in the at least one arm, and the frame locking feature includes one or more shoulders that extend from the at least one latching member toward the at least one arm when the frame is locked to the clamp member.

In some aspects of the first implementation, the one or more shoulders are insertable into the one or more grooves when the frame is locked to the clamp member to thereby lock the frame to the clamp member.

In some aspects of the first implementation, the one or more grooves includes a plurality of grooves. At least one of the one or more shoulders is selectively insertable into a respective groove of the plurality of grooves to adjust a height of a gap between the baseplate of the clamp and the frame.

In some aspects of the first implementation, the at least one latching member is biased toward the at least one arm.

In some aspects of the first implementation, the locking device further includes a boss extending from the at least one arm of the clamp member. The boss contacts the frame when the frame is fit over the clamp member to prevent the frame from sliding past the boss.

In some aspects of the first implementation, a position of the boss along a length of the at least one arm defines a minimum height of a gap between the baseplate and the underside of the frame.

In some aspects of the first implementation, the at least one arm includes a first arm and a second arm extending from opposite ends of the baseplate, and the at least one latching member including a first latching member and a second latching member. Each of the first arm and the second arm has a clamp locking feature. Each of the first latching member and the second latching member has a frame locking feature.

In some aspects of the first implementation, the clamp locking feature of both the first arm and the second arm includes a plurality of grooves, the frame locking feature of the first latching member includes a first shoulder that is selectively insertable into the plurality of grooves of the first arm, and the frame locking feature of the second latching member includes a second shoulder that is selectively insertable into the plurality of grooves of the second arm.

In a second implementation, the present disclosure is directed to a printed circuit board (PCB) assembly that includes a PCB, a cable connector mounted on the PCB, a cable assembly inserted into the cable connector, and a locking device for securing the cable assembly to the cable connector. The locking device includes a clamp member and a frame. The clamp member includes a baseplate disposed on a first side of the PCB, and first and second arms that extend through apertures in the PCB to an opposing second side of the PCB. The frame is disposed on the second side of the PCB, and has apertures defined therein through which the first arm and the second arm of the clamp member extend. The frame is lockable to the clamp member such that at least a portion of the cable assembly and a portion of the cable connector are positioned between the clamp member and the frame. The clamp member and the frame apply a compressive force to the portion of the cable assembly and the portion of the cable connector when the frame is locked to the clamp member. The compressive force prevents disconnection of the cable assembly from the cable connector In some aspects of the second implementation, the frame includes a first latching member extending away from the second side of the PCB and being aligned with the first arm, and a second latching member extending away from the second side of the PCB and being aligned with the second arm. The first latching member and the second latching member are positioned between the first arm and the second arm.

In some aspects of the second implementation, the first arm and the second arm each include a plurality of grooves, the first latching member including a first shoulder extending toward and being selectively insertable into a respective groove of the plurality of grooves of the first arm, and the second latching member including a second shoulder extending toward and being selectively insertable into a respective groove the plurality of grooves of the second arm.

In some aspects of the second implementation, the plurality of grooves of the first arm and the second arm each includes a proximal groove that is nearer to the baseplate and a distal groove that is farther away from the baseplate. When the first shoulder is inserted into the proximal groove of the first arm and the second shoulder is inserted into the proximal groove of the second arm, a gap having a first height is defined between the baseplate and the frame. When the first shoulder is inserted into the distal groove of the first arm and the second shoulder is inserted into the distal groove of the second arm, a gap having a second height is defined between the baseplate and the frame, the second height being greater than the first height.

In some aspects of the second implementation, the frame further includes a compression member extending from an underside thereof. The compression member and the clamp apply the compressive force to the portion of the cable assembly and the portion of the cable connector when the frame is locked to the clamp member.

In some aspects of the second implementation, both the first arm and the second arm have a flared proximal end adjacent to the baseplate that is wider than the apertures defined in the PCB.

In some aspects of the second implementation, the flared proximal end of the first arm and the flared proximal end of the second arm contact the first side of the PCB prevent further insertion of the first arm and the second into the apertures of the PCB, so as to define a minimum distance between the baseplate and the first side of the PCB.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments and are therefore not to be considered as limitations on the scope of the various embodiments or claims.

DETAILED DESCRIPTION

Figure 1:
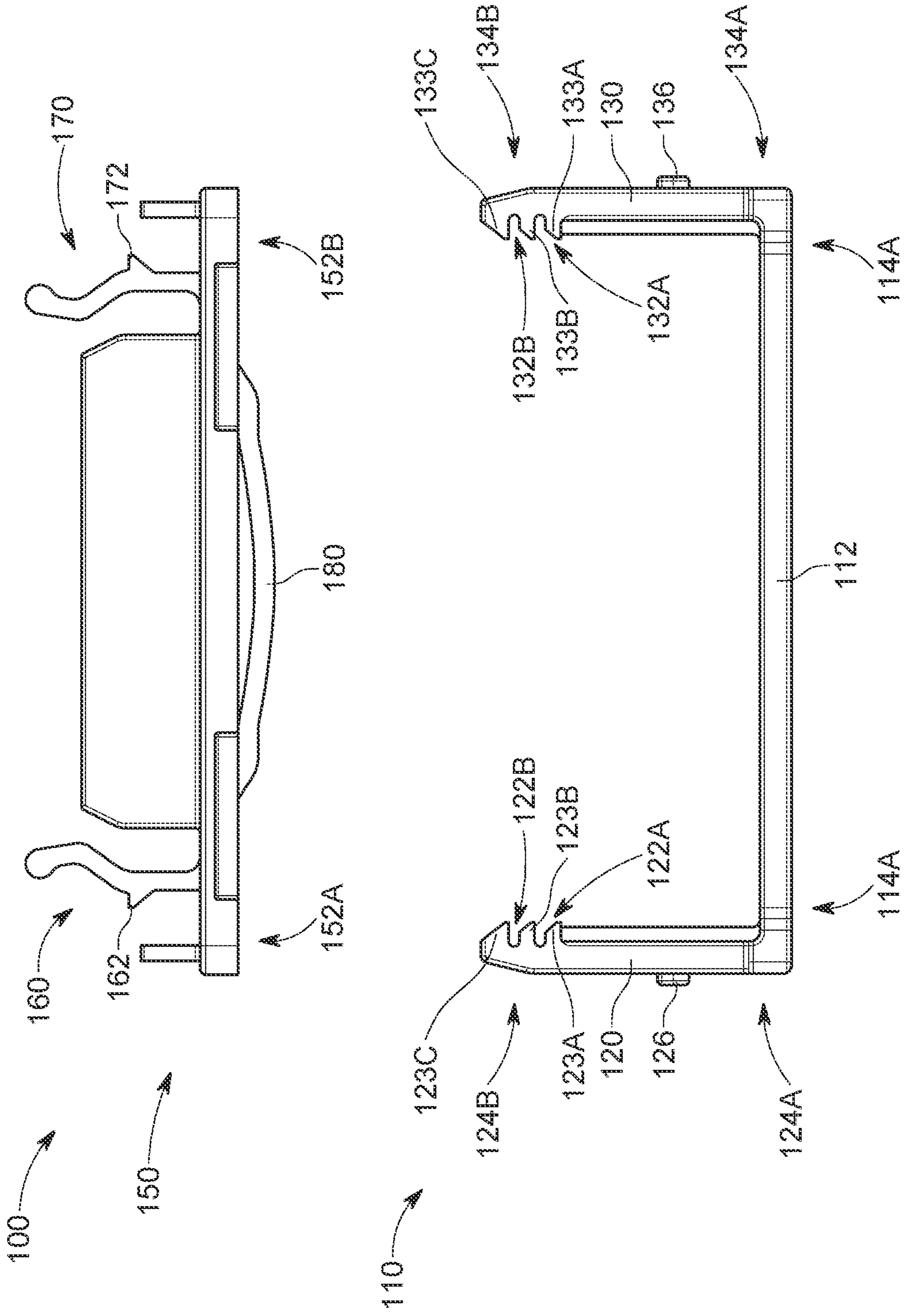
FIG. 1 is an exploded view of a locking device comprising a clamp member and a frame, according to aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 illustrates an exploded view of locking device 100 that can be used to secure a cable assembly to a cable connector of a printed circuit board (PCB). The locking device 100 is formed from a clamp member 110 and a frame 150. As discussed in more detail herein, the clamp member 110 can be placed on the underside of the PCB with portions of the clamp member 110 extending through the PCB to the top side. The frame 150 is configured to fit over these portions of the clamp member 110 from the top side, such that a portion of the PCB, a portion of the cable connector, a portion of the cable assembly, or any combination thereof, are positioned between the clamp member 110 and the frame 150. When the frame 150 is locked to the clamp member 110, the clamp member 110 and the frame 150 (and/or a specific portion of the clamp member 110 and the frame 150) apply a compressive force to the portion of the PCB, the portion of the cable connector, the portion of the cable assembly, or any combination thereof. This compressive force prevents (or at least aids in preventing) the cable assembly from being disconnected from the cable connector.

The clamp member 110 includes a generally flat baseplate 112 with a first end 114A and an opposing second end 114B, a first arm 120 extending from the first end 114A of the baseplate 112, and a second arm 130 extending from the second end 114B of the baseplate 112. The first arm 120 and the second arm 130 are generally parallel to each other, and both are generally perpendicular to the baseplate 112. When the locking device 100 is in use, the baseplate 112 will be disposed on one side of the PCB (e.g., the bottom side), while the first arm 120 and the second arm 130 will extend through respective apertures in the PCB to the other side (e.g., the top side).

The clamp member 110 also includes two bosses extending from the arms 120 and 130. The first arm 120 includes a boss 126 that extends outward from the first arm 120, away from both the second end 114B of the baseplate 112 and the second arm 130. Similarly, the second arm 130 includes a boss 136 that extends outward from the second arm 130, away from both the first end 114A of the baseplate 112 and the first arm 120. As discussed in more detail herein, the bosses 126 and 136 will contact the frame 150 when the frame 150 is fit over the clamp member 110, to prevent the frame 150 from moving closer to the baseplate 112.

The frame 150 has a generally rectangular outline that matches the shape of the baseplate 112. The frame 150 include a first latching member 160 extending from a first end 152A of the frame 150, and a second latching member 170 extending from a second end 152B of the frame 150. In the illustrated implementation, the frame 150 also includes a compression member 180 extending from the underside thereof in an arcuate shape.

Both the clamp member 110 and the frame 150 including locking features that mate with each other when the frame 150 is fit over the clamp member 110. These locking features secure the frame 150 to the clamp member 110 so that the clamp member 110 and the frame 150 apply the compressive force to the portion of the PCB and/or the portion of the cable assembly (and/or any other components or portions of components) that are disposed between the clamp member 110 and the frame 150.

The locking features of the clamp member 110 are referred to as clamp locking features, and are disposed on both the first arm 120 and the second arm 130. The locking features of the frame 150 are referred to as frame locking features, and are disposed on both the first latching member 160 and the second latching member 170. When the frame 150 is fit over the clamp member 110, the frame 150 will slide over the first arm 120 and the second arm 130, such that the locking features of the first arm 120 and the first latching member 160 will be positioned next to each other, and such that the locking features of the second arm 130 and the second latching member 170 will be positioned next to each other. This allows the clamp locking features to mate with the frame locking features to lock the frame 150 to the clamp member 110.

In the illustrated implementation, the clamp locking feature of each arm includes one or more grooves defined therein. The first arm 120 includes a first groove 122A and a second groove 122B that are defined between a series of teeth 123A, 123B, and 123C. Similarly, the second arm 130 includes a first groove 132A and a second groove 132B that are defined between a series of teeth 133A, 133B, and 133C. A proximal end 124A of the first arm 120 is located where the first arm 120 originates from the baseplate 112, and the grooves 122A and 122B are formed at the opposing distal end 124B of the first arm 120. Similarly, a proximal end 134A of the second arm 130 is located where the second arm 130 originates from the baseplate 112, and the grooves 132A and 132B are formed at the opposing distal end 134B of the second arm 130. As shown, the first groove 122A is closer to the proximal end 124A than the second groove 122B, and the first groove 132A is closer to the proximal end 134A than the second groove 132B. Thus, the first grooves 122A and 132A can also be referred to as proximal grooves, and the second grooves 122B and 132B can also be referred to as distal grooves.

In the illustrated implementation, the frame locking feature of each latching member 160, 170 includes an outwardly-projecting shoulder that can be inserted into one of the grooves of the corresponding arm 120, 130 when the frame 150 is fit over the clamp member 110. The first latching member 160 includes a shoulder 162 that projects toward the first end 152A of the frame 150, and away from both the second end 152B of the frame 150 and the second latching member 170. Similarly, the second latching member 170 includes a shoulder 172 that projects toward the second end 152B of the frame 150, and away from both the first end 152A of the frame 150 and the first latching member 160. In the illustrated implementation, the shoulders 162 and 172 are located approximately midway along the height of their respective latching members 160 and 170. However, the shoulders 162 and 172 can generally be located anywhere along the height of the respective latching members 160 and 170 as needed to mate with the grooves of the clamp member 110.

The clamp locking features and the frame locking features can have other designs as well. In one example, the clamp locking features could be shoulders while the frame locking features are grooves, opposite from the illustrated implementation. In other examples, the locking features could include hooks, clips, snaps, hook-and-loop fasteners, bosses, and any other suitable locking feature. In a further example, the both the clamp locking features and the frame locking features could include apertures defined in their respective portions of the locking device 100, and a separate component (e.g., a pin, a rod, etc.) can be inserted into aligned pairs of apertures to lock the frame 150 to the clamp member 110.

Figure 2:
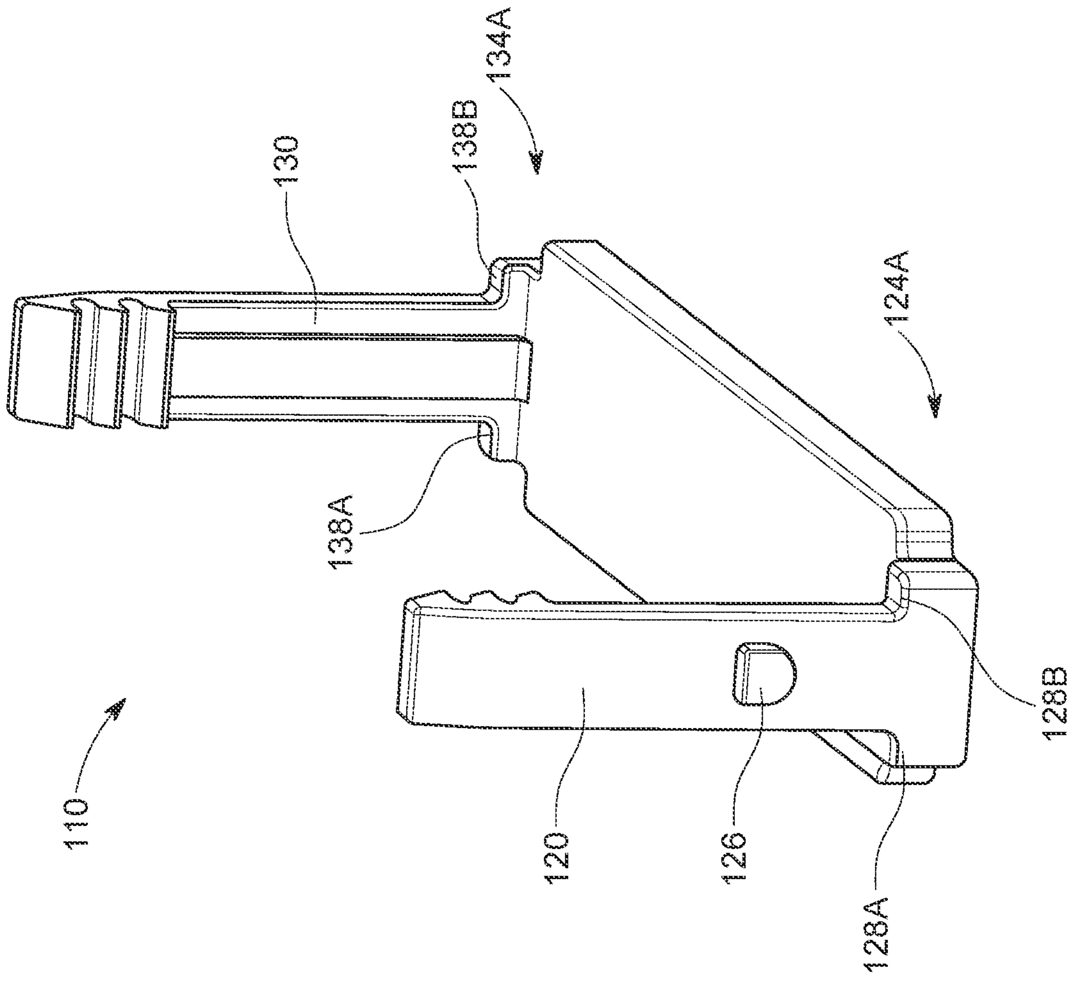
FIG. 2 is a perspective view of the clamp member of the locking device of FIG. 1, according to aspects of the present disclosure.

FIG. 2 is a perspective view of the clamp member 110. As shown, the proximal end 124A of the first arm 120 has a flared shape formed by two shoulder portions 128A and 128B. Similarly, the proximal end 134A of the second arm 130 has a flared shape formed by two shoulder portions 138A and 138B. The proximal ends 124A and 134A are thus wider than the remaining lengths of the first arm 120 and the second arm 130, respectively. When the first arm 120 and the second arm 130 are inserted through apertures in the PCB, the flared proximal ends 124A and 134A will be wider than these apertures. Contact between the flared proximal ends 124A and 134A and the underside of the PCB will prevent the first arm 120 and the second arm 130 from being inserted any further. The flared proximal ends 124A and 134A thus define the maximum length of the first arm 120 and the second arm 130 that will extend past the top surface of the PCB.

FIG. 2 also illustrates the boss 126 of the first arm 120. A shown, the boss 126 has a generally half-circle shape with a flat upper edge facing toward the distal end 124B. The boss 136 of the second arm 130, while not visible in FIG. 2A, will generally have the same shape as the boss 126. The flat upper edges of the bosses 126 and 136 will contact the frame 150 when the frame 150 is slid over the first arm 120 and the second arm 130.

Figure 3A:
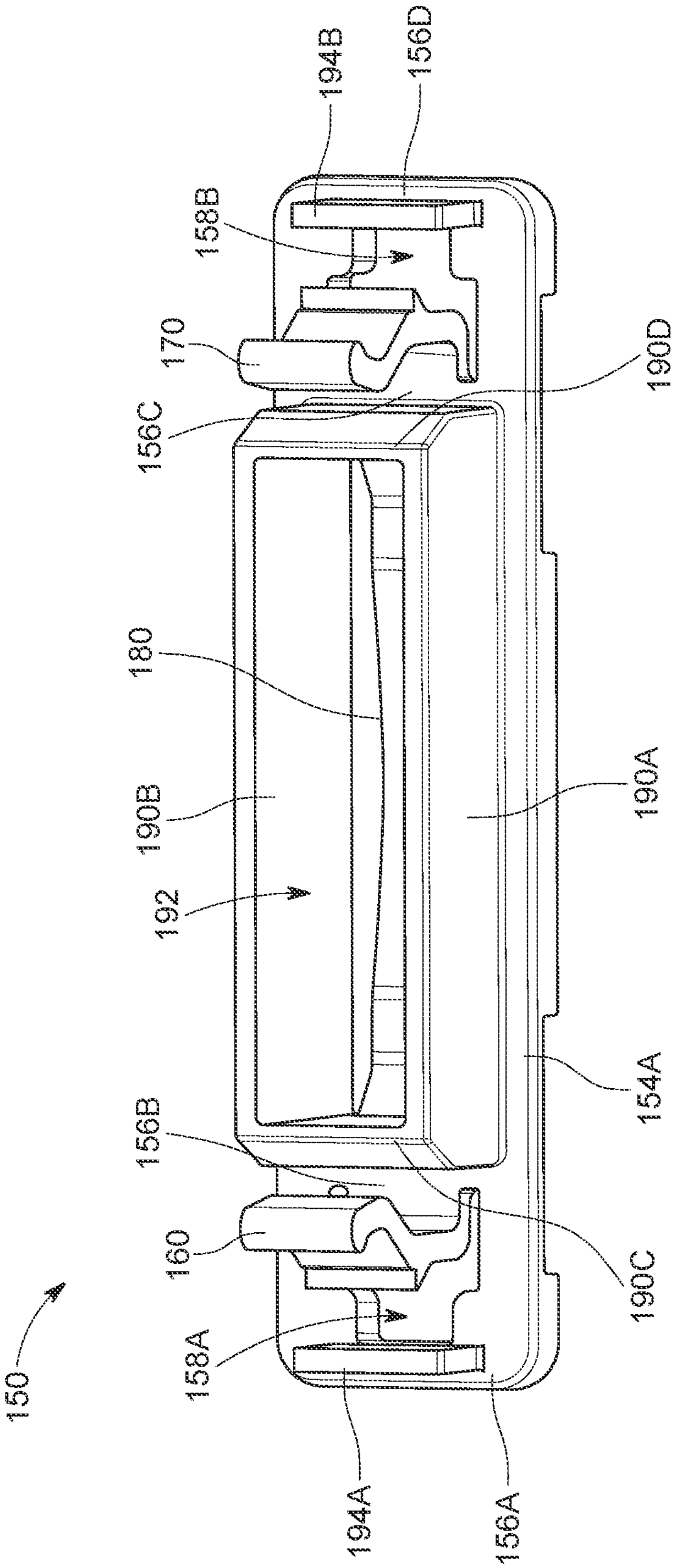
FIG. 3A is a top perspective view of the frame of the locking device of FIG. 1, according to aspects of the present disclosure.
Figure 3B:
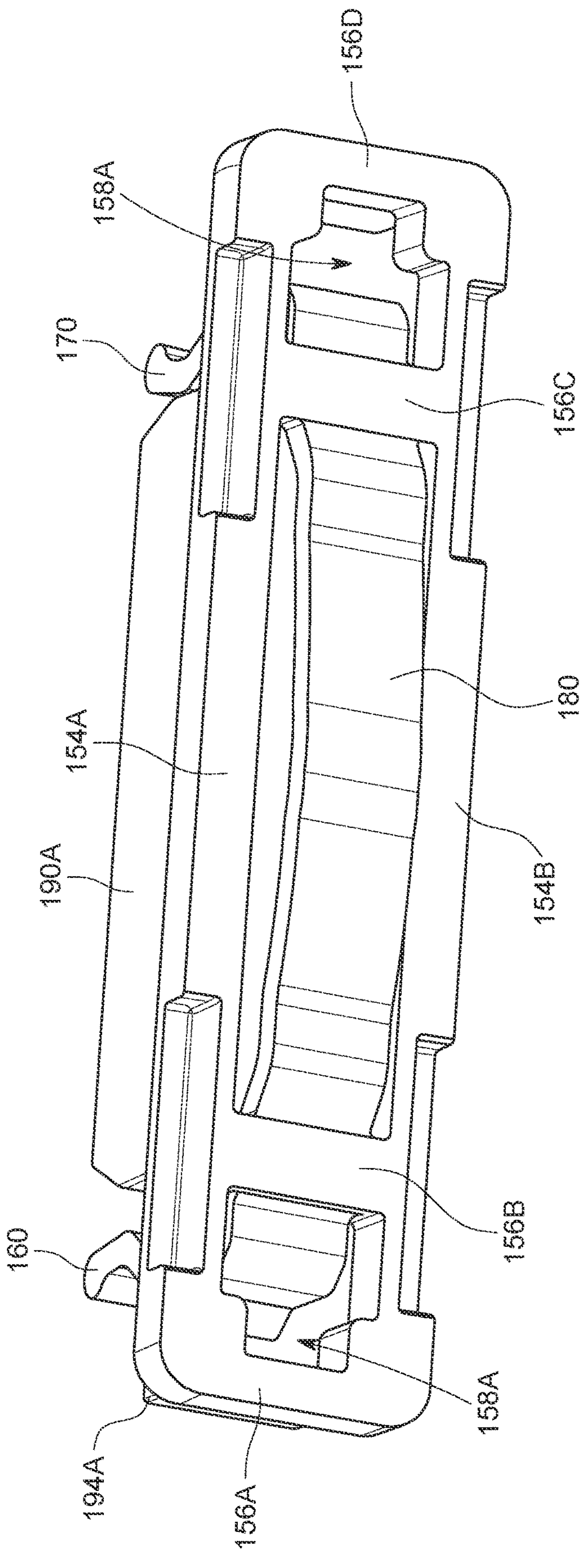
FIG. 3B is a bottom perspective view of the frame of the locking device of FIG. 1, according to aspects of the present disclosure.

FIG. 3A illustrates a top perspective view of the frame 150, while FIG. 3B illustrates a bottom perspective view of the frame 150. As shown, the frame 150 is formed from two longer legs 154A and 154B, and four shorter transverse legs 156A-156D that connect the leg 154A with the leg 154B. The first transverse leg 156A connects one end of leg 154A and leg 154B, while the fourth transverse leg 156D connects the opposite end of both legs 154A and 154B. The second transverse leg 156B connects legs 154A and 154B at a point that is closer to the first transverse leg 156A than to the fourth transverse leg 156D. The third transverse leg 156C connects legs 154A and 154B at a point that is closer to the fourth transverse leg 156D than to the first transverse leg 156A.

Together, the legs define apertures in the frame 150 through which the first arm 120 and the second arm 130 of the clamp member 110 will extend when the frame 150 is slid over the clamp member 110. A first aperture 158A is defined between the first transverse leg 156A, the second transverse leg 156B, and the portions of the legs 154A and 154B therebetween. Similarly, a second aperture 158B is defined between the third transverse leg 156C, the fourth transverse leg 156D, and the portions of the legs 154A and 154B therebetween. When the frame 150 is slid over the clamp member 110, the first arm 120 will extend through the first aperture 158A, and the second arm 130 will extend through the second aperture 158B.

The first latching member 160, the second latching member 170, and the compression member 180 all extend from the second transverse leg 156B and the third transverse leg 156C. The first latching member 160 extends from the top side of the second transverse leg 156B, next to the first aperture 158A. The second latching member 170 extends from the top side of the third transverse leg 156C, next to the second aperture 158B. The compression member 180 has an arcuate shape, with one end extending downward from the side and/or bottom of the second transverse leg 156B, and the other end extending downward from the third transverse leg 156C.

The frame 150 also includes walls 190A-190D that extend from the top side of the frame 150. Wall 190A extends from the top side of the leg 154A and wall 190B extends from the top side of the leg 154B. Wall 190C extends from the top side of the second transverse leg 156B and connects one end of wall 190A and wall 190B. Wall 190D extends from the top side of the third transverse leg 156C and connects the other end of wall 190A and wall 190B. A hollow interior space 192 is defined between the walls 190A-190D. Walls 190A and 190D are used to prevent further inward movement of the latching members 160 and 170. The hollow interior space 192 can serve as the travel path for a sliding block during the injection molding process of forming the frame 150.

The frame 150 further includes a pair of end walls 194A and 194B that extend from the top side of the frame 150. End wall 194A extends from the top side of the first transverse leg 156A, and end wall 194B extends from the top side of the fourth transverse leg 156D. Thus, the first latching member 160 and the second latching member 170 are disposed in between the end walls 194A and 194B. The end walls 194A and 194B serve to strength the transverse legs 156A and 156D.

Figure 4A:
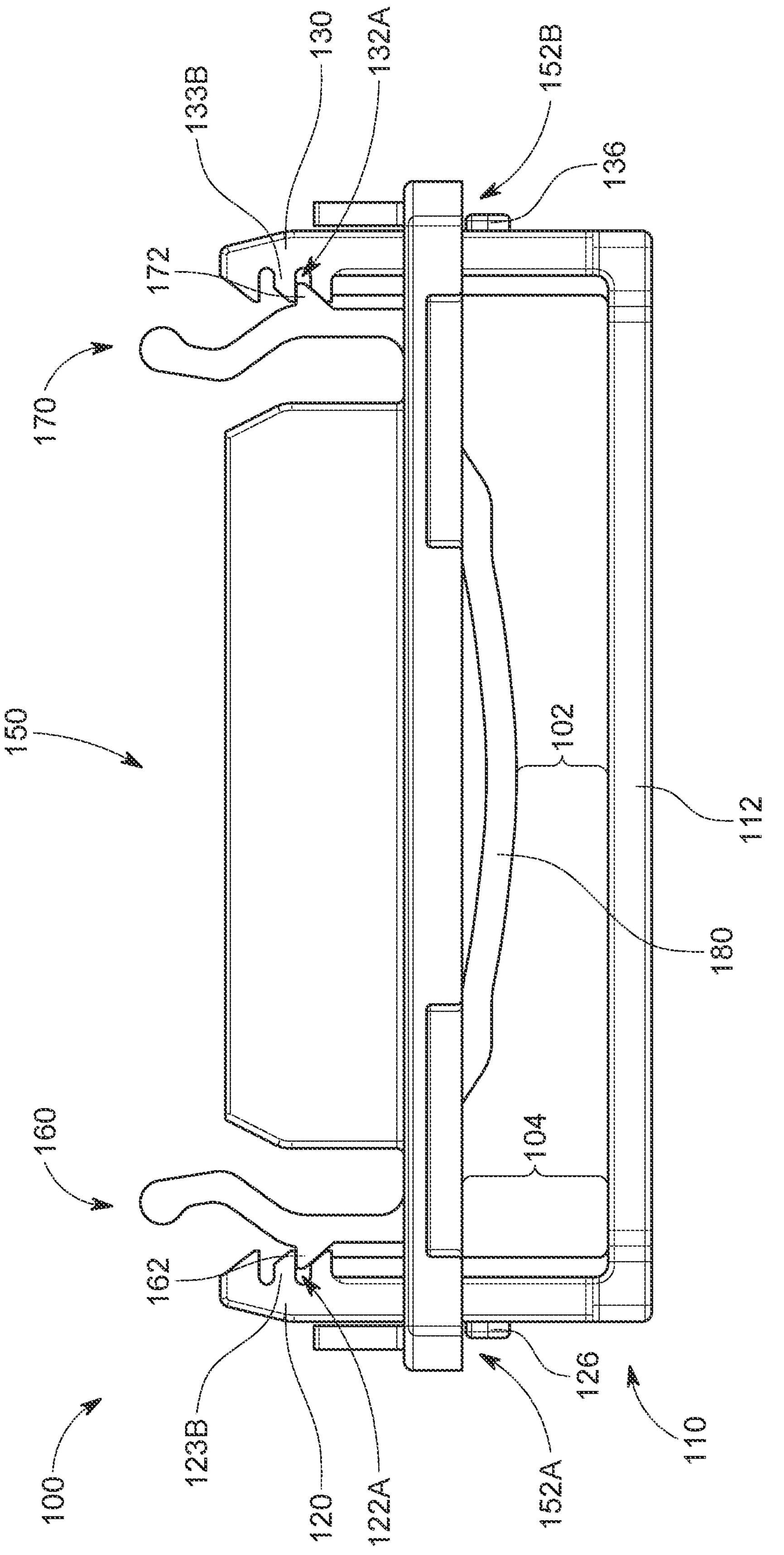
FIG. 4A is a front view of the locking device of FIG. 1 when the frame is fit over and locked to the clamp member, according to aspects of the present disclosure.

FIG. 4A shows a front view of the locking device 100 when the frame 150 is fit over and locked to the clamp member 110. As can be seen, the first arm 120 of the clamp member 110 extends through the first aperture 158A in the frame 150, and is positioned next to and generally parallel to the first latching member 160. Similarly, the second arm 130 of the clamp member 110 extends through the second aperture 158B in the frame 150, and is positioned next to and generally parallel to the second latching member 170. Thus, when the frame 150 is fit over the clamp member 110 and the locking device 100 is assembled, the first latching member 160 and the second latching member 170 will be positioned between the first arm 120 and the second arm 130.

The clamp locking features and the frame locking features mate with each other to secure the frame 150 to the clamp member 110. As shown, the shoulder 162 of the first latching member 160 extends outward toward the first arm 120, and is seated within the first groove 122A. When seated within the first groove 122A, the upper surface of the shoulder 162 contacts the lower surface of the middle tooth 123B. Similarly, the shoulder 172 of the second latching member 170 extends outward toward the second arm 130, and is seated within the first groove 132A. When seated within the first groove 132A, the upper surface of the shoulder 172 contacts the lower surface of the middle tooth 133B. This contact between the shoulders 162, 172 and the teeth 123B, 133B prevents the frame 150 from being lifted off of the clamp member 110.

When the frame 150 is fit over and locked to the clamp member 110, a gap 102 is defined between the baseplate 112 and the lowest point of the compression member 180, and a gap 104 is defined between the baseplate 112 and the underside of the frame 150. In implementations where the frame 150 includes the compression member 180, at least a portion of the PCB and a portion of the cable assembly will fit within the gap 102. In these implementations, the baseplate 112 and the compression member 180 will apply the compressive force to the portion of the PCB and/or the portion of the cable assembly. In implementations where the frame 150 does not include the compression member 180, at least a portion of the PCB and a portion of the cable assembly will fit within the gap 104. In these implementations, the baseplate 112 and the underside of the frame 150 will apply the compressive force to the portion of the PCB and/or the portion of the cable assembly. In either implementations, the gaps 102 and 104 in which the PCB and/or the cable assembly are located will be sized as necessary to receive the PCB and/or the cable assembly In either of these implementations, the height of the gaps 102 and 104 can be increased by seating the shoulders 162 and 172 into the respective second grooves 122B and 132B instead of the respective first grooves 122A and 132A, in order to accommodate PCBs and/or cable assemblies of different sizes. Thus, the shoulders 162 and 172 can be selectively inserted into different grooves of the arms 120 and 130, in order to adjust the height of the gap 102 between baseplate 112 and the compression member 180, and/or the height of the gap 104 between the baseplate 112 and the underside of the frame 150.

The bosses 126 and 136 also serve as stoppers to prevent the frame 150 from sliding too far down onto the clamp member 110. When the frame 150 is fit onto the clamp member 110, the boss 126 of the first arm 120 is positioned underneath the first end 152A of the frame 150, and the boss 136 of the second arm 130 is positioned underneath the second end 152B of the frame 150, so that the frame 150 cannot move any further down the arms 120 and 130.

Figure 4B:
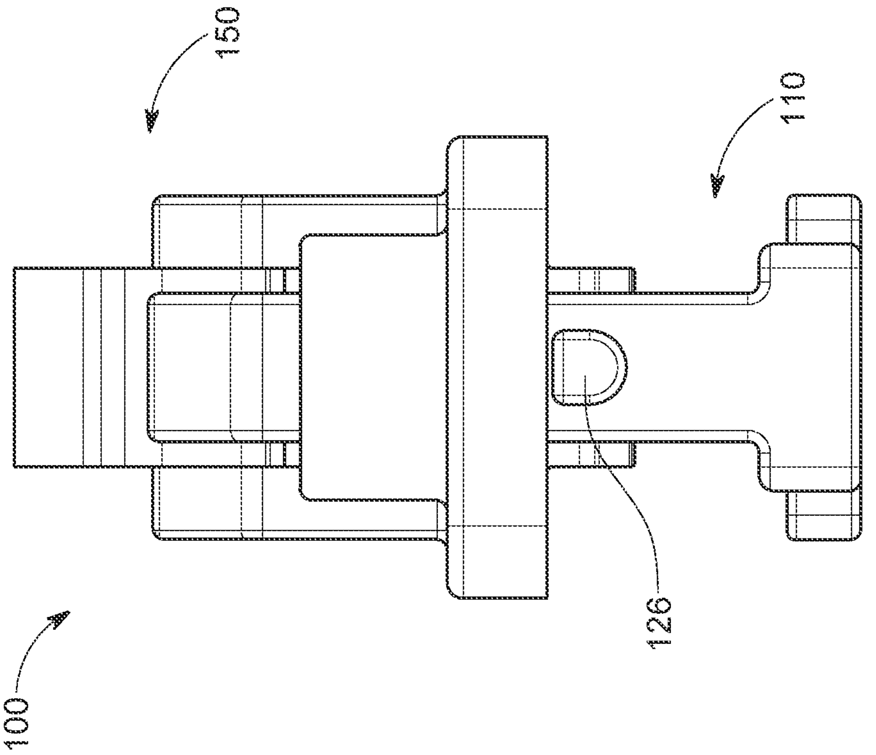
FIG. 4B is a side view of the locking device of FIG. 1 when the frame is fit over and locked to the clamp member, according to aspects of the present disclosure.

FIG. 4B is a side view of the locking device 100 when assembled as shown in FIG. 4A. As shown, the underside of the frame 150 is positioned slightly above the top edge of the boss 126 of the first arm 120. While not visible in FIG. 4B, the underside of the frame 150 is also positioned slightly above the top edge of the boss 136 of the second arm 130. Thus, in the illustrated implementation, the position of the bosses 126, 136 along the length of their respective arms 120, 130 define a minimum height of the gap 102 (between the baseplate 112 and the compression member 180) and the gap 104 (between the baseplate 112 and the underside of the frame 150). The relative positions between the shoulders 162, 172 and the grooves 122A, 122B, 132A, 132B define the heights of the gaps 102 and 104 during standard use of the locking device 100. In other implementations however, the bosses 126, 136 may be positioned so that they contact the underside of the frame 150 when the shoulders 162, 172 are seated in the first grooves 122A, 132A (or whichever other grooves may be the most proximal).

Figure 5:
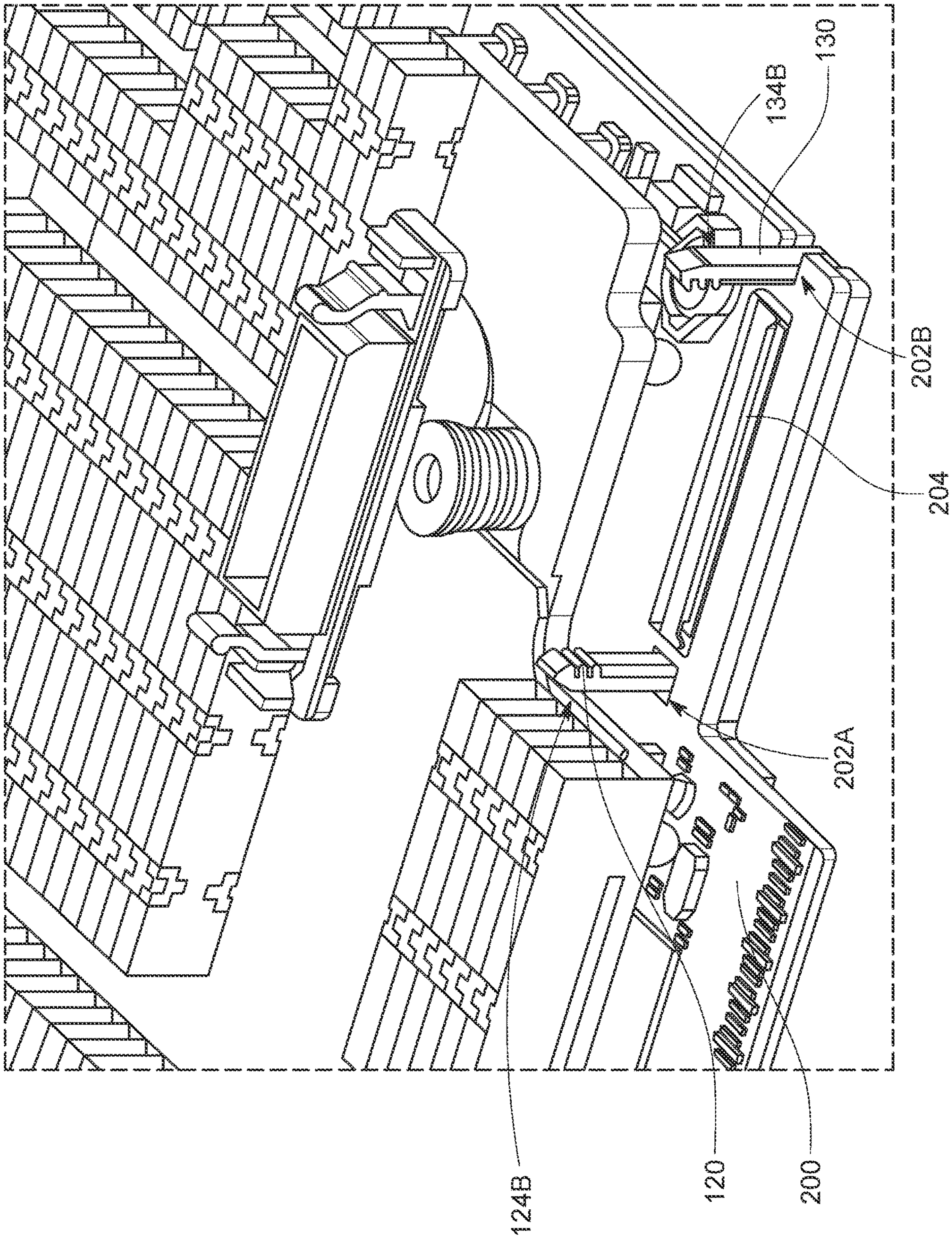
FIG. 5 is a perspective view of the locking device of FIG. 1 being coupled to a printed circuit board (PCB) with a cable connector, according to aspects of the present disclosure.

FIG. 5 shows the positions of the clamp member 110 and the frame 150 relative to a printed circuit board (PCB) 200 when the locking device 100 is being installed. As shown, the PCB 200 includes apertures 202A and 202B defined therein, with a cable connector 204 mounted on the PCB 200 between the apertures 202A and 202B. The first arm 120 and the second arm 130 are inserted through the apertures 202A and 202B from the underside of the PCB 200 such that the cable connector 204 is positioned between the first arm 120 and the second arm 130.

The distal ends 124B, 134B of the arms 120, 130 extend above the top surface of the PCB 200. The frame 150 can then be fit onto the clamp member 110 by sliding the first aperture 158A over the first arm 120, and sliding the second aperture 158B over the second arm 130. Thus, during use of the locking device 100, the baseplate 112 of the clamp member 110 will generally be disposed on a first side (e.g., the bottom side) of the PCB 200, while the frame 150 and the distal ends 124B, 134B of the arm 120, 130 will be disposed on the opposing second side (e.g., the top side) of the PCB 200.

Figure 6:
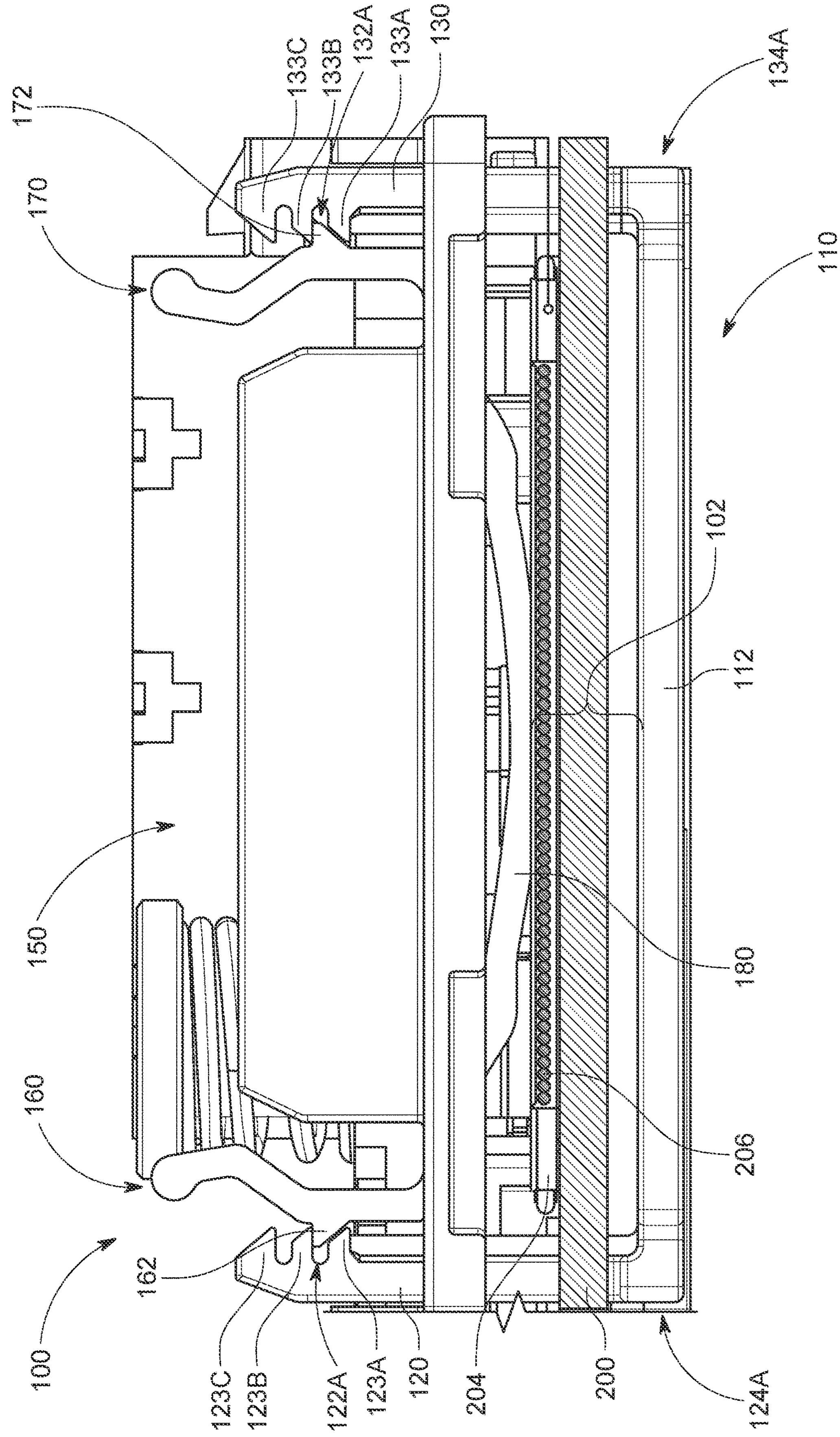
FIG. 6 is a front view of the locking device of FIG. 5 coupled to the PCB and applying a compressive force to a portion of the PCB and a portion of a cable assembly plugged into the cable connector of the PCB, according to aspects of the present disclosure.

FIG. 6 shows a side view of the locking device 100 installed on the PCB 200 when a cable assembly 206 is plugged into the cable connector 204. The entirely of the locking device 100, the PCB 200, the cable connector 204, and the cable assembly 206 can be referred to as a PCB assembly. As shown, the arms 120 and 130 are inserted through the apertures 202A and 202B of the PCB 200 from the underside, and the frame 150 fit over the clamp member 110 by sliding the first aperture 158A over the first arm 120, and sliding the second aperture 158B over the second arm 130. The frame 150 is then secured to the clamp member 110 by seating the shoulders 162, 172 of the latching members 160, 170 into the corresponding grooves 122A, 132A of arms 120, 130.

In some implementations, to install the frame 150, the latching members 160 and 170 are bent inward so that the shoulders 162, 172 are positioned between arms 120, 130, and the frame 150 is slid over the arms 120, 130. The latching members 160 and 170 can then be moved outward so that the shoulders 162, 172 are inserted into grooves of the arms 120, 130 to thereby lock the frame 150 to the clamp member. In general, the latching members 160 and 170 will be resilient and/or formed from a resilient material, and are both biased in the direction toward their respective arm 120, 130. Thus, in some implementations, the user installing the locking device 100 will bend the latching members 160, 170 inward to place the frame 150 onto the clamp member 110, and the latching members 160, 170 can be released so that the shoulders 162, 172 will automatically insert into the grooves of the arms 120, 130.

In other implementations, the latching members 160 and 170 do not need to be manually bent inward. For example, as shown in FIG. 6, the teeth 123A-123C of the first arm 120 and the teeth 133A-133C of the second arm 130 slope downward toward the top surface of the PCB 200. As the frame 150 is placed over the clamp member 110, contact between the teeth 123A-123C and the shoulder 162 will force the first latching member 160 inward, and contact between the teeth 133A-133C and the shoulder 172 will force the second latching member 170 inward. The frame 150 can then continue to be slid over the arms 120 and 130, until the shoulders 162 and 172 reach the desired groove in the arms 120 and 130. At this point, the latching members 160 and 170 automatically return to their original positions and the shoulders 162 and 172 will be inserted into the desired grooves.

In further implementations, the latching members 160 and 170 are movable but not resilient, and are thus not biased toward any particular position. In these implementations, the user installing the locking device 100 may need to manually move the latching members 160 and 170 inward away from the arms 120 and 130, and/or outward toward the arms 120 and 130, in order to slide the frame 150 onto the clamp member 110.

As shown in FIG. 6, when the frame 150 is fit over and locked to the clamp member 110, a portion of the PCB 200 and a portion of the cable assembly 206 are positioned in the gap 102 between the baseplate 112 and the lowest point of the compression member 180. The compression member 180 will generally be sized so that when the frame 150 is locked to the clamp member 110 in the desired position, the compression member 180 will press against the portion of the cable assembly 206, such that the clamp member 110 and the compression member 180 apply the compressive force to the portion of the PCB 200 and the portion of the cable assembly 206. This compressive force secures (or at least aids in securing) the cable assembly 206 to the cable connector 204, and prevents (or at least aids in preventing) the cable assembly 206 from being inadvertently removed from the cable connector 204.

In the illustrated implementation, the portion of the PCB 200 and the portion of the cable assembly 206 are located between the compression member 180 and the flared proximal ends 124A, 134A of the arms 120, 130. The arms 120 and 130 extend through the PCB 200 until the flared proximal ends 124A, 134A contact the underside of the PCB 200. The flared proximal ends 124A and 134A thus define the minimum distance between the baseplate 112 and the underside of the PCB 200. In other implementations however, the proximal ends 124A, 134A may not be flared, such that the baseplate 112 will contract the underside of the PCB 200. In these implementations, the portion of the PCB 200 and the portion of the cable assembly 206 are located between the compression member 180 and the surface of the baseplate 112 itself.

In some implementations, the compression member 180 is resilient and/or is formed from a resilient material. In these implementations, the compression member 180 will be compressed slightly when the frame 150 is fit over and locked to the clamp member 110, and will force the shoulders 162, 172 of the latching members 170, 170 upward against the adjacent tooth of the arms 120, 130. This force aids in preventing the shoulders 162 and 172 from being inadvertently removed from the groove into which each shoulder has been inserted.

Figure 7A:
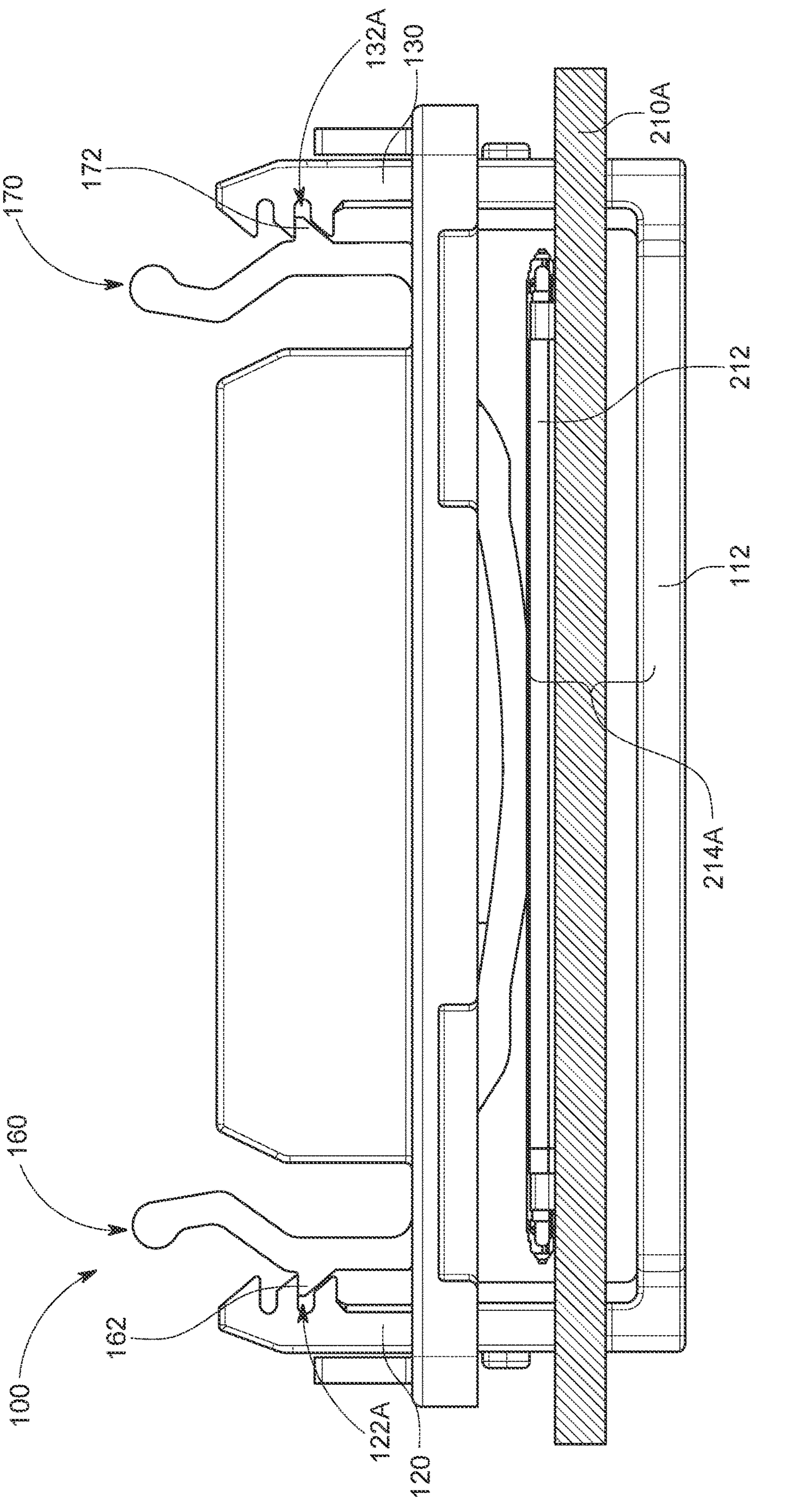
FIG. 7A is a front view of the locking device of FIG. 1 coupled to a first PCB, according to aspects of the present disclosure.
Figure 7B:
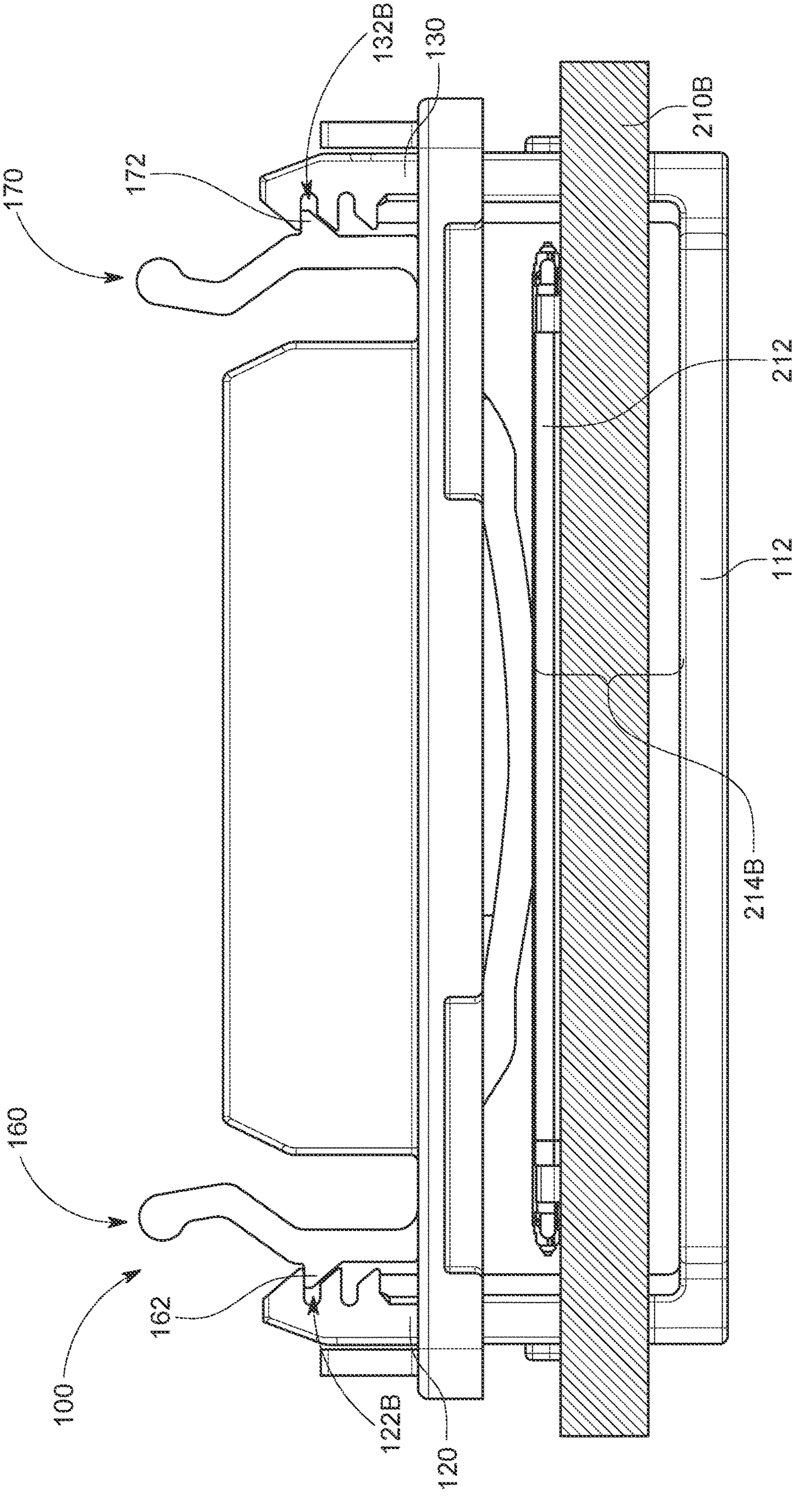
FIG. 7B is a front view of the locking device of FIG. 1 coupled to a second PCB that is thicker than the first PCB, according to aspects of the present disclosure.

FIGS. 7A and 7B illustrate the ability of the locking device 100 to adjust for different sizes of the PCB, the cable connector, the cable assembly, or any combination thereof. In FIG. 7A, the locking device 100 has been coupled to a PCB 210A that has a cable connector 212 mounted thereon. The shoulder 162 of the first latching member 160 is inserted into the first (proximal) groove 122A of the first arm 120, and the shoulder 172 of the second latching member 170 is inserted into the first (proximal) groove 132A of the second arm 130. In this configuration, a gap 214A is defined between the baseplate 112 and the compression member 180. The gap 214A has a height that accommodates the PCB 210A and a cable assembly inserted into the cable connector 212.

In FIG. 7B, the locking device 100 has been coupled to a PCB 210B that has the cable connector 212 mounted thereon. The PCB 210B is thicker than the PCB 210A. The shoulder 162 of the first latching member 160 is inserted into the second (distal) groove 122B of the first arm 120, and the shoulder 172 of the second latching member 170 is inserted into the second (distal) groove 132B of the second arm 130. In this configuration, a gap 214B is defined between the baseplate 112 and the compression member 180. The gap 214B has a greater height than the gap 214A, which is thus able to accommodate the thicker PCB 210B and a cable assembly inserted into the cable connector 212.

Figure 8:
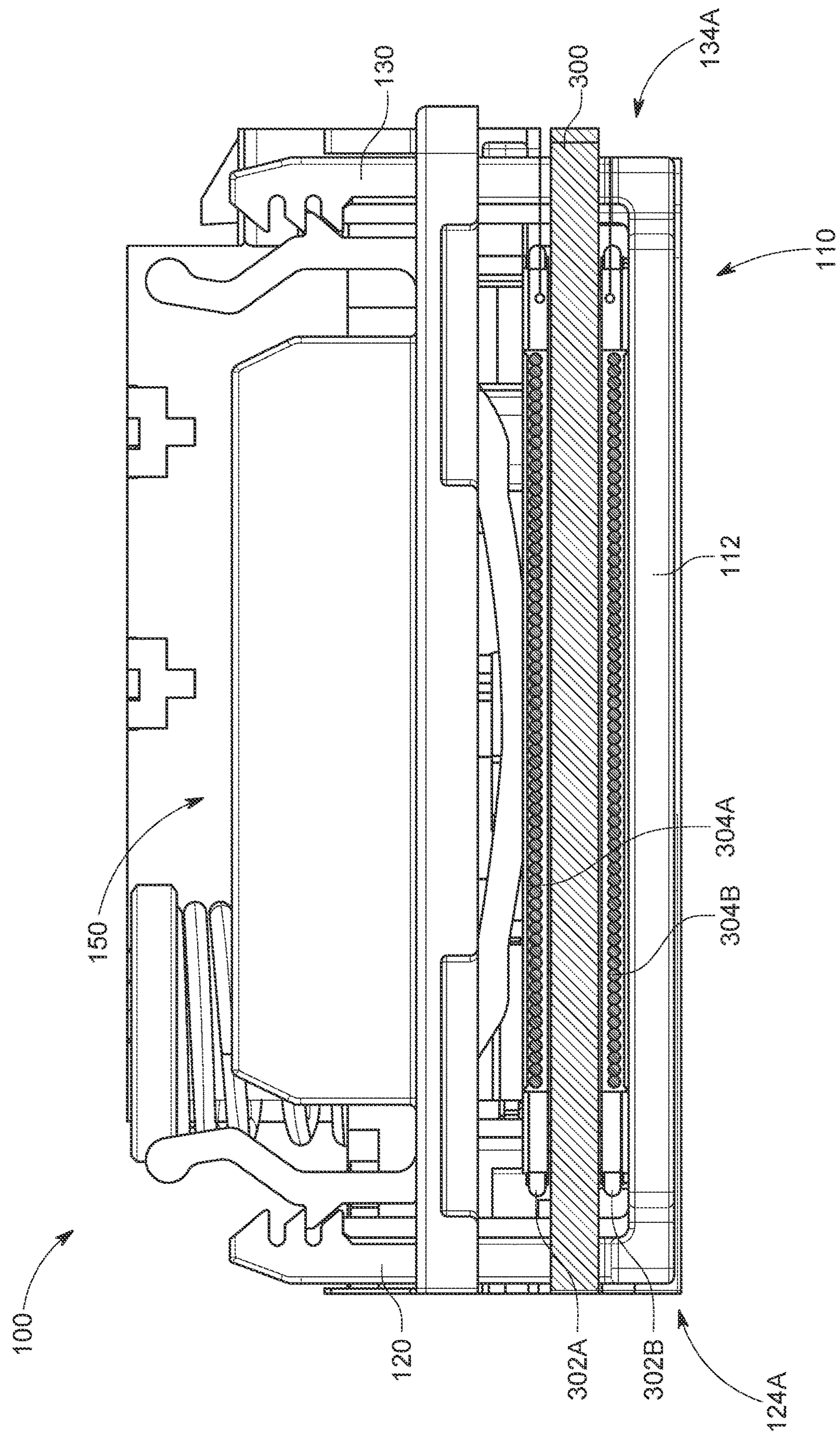
FIG. 8 is a front view of the locking device of FIG. 1 coupled to a PCB having a first cable connector on a top surface thereof and a second cable connector on a bottom surface thereof, according to aspects of the present disclosure.

Referring now to FIG. 8, the locking device 100 can also be used with a PCB that has cable connectors on both the top surface and the bottom surface. In FIG. 8, the arms 120 and 130 of the clamp member 110 have been inserted through apertures in a PCB 300, and the frame 150 has been fit over and locked to the clamp member 110. The PCB 300 includes a first cable connector 302A mounted on the top surface, and a second cable connector 302B mounted on the bottom surface. A first cable assembly 304A is plugged into the first cable connector 302A, and a second cable assembly 304B is plugged into the second cable connector 302B. As shown, the gap 106 that is defined between the baseplate 112 and the underside of the PCB 300 (due to the flared proximal ends 124A, 134A of the arms 120, 130) is sufficiently large to accommodate for the second cable connector 302B and the second cable assembly 304B. Thus, the locking device 100 is able to work both with PCBs having only a cable connector on one surface, and with PCBs having a cable connectors on both surfaces, without having to be redesigned or reconfigured.

While the illustrated implementation of the locking device 100 only shows two separate sets of grooves in the arms 120 and 130, other implementations could have any plurality of grooves, to allow the gap between the baseplate 112 and the bottom point of the compression member to be adjusted to accommodate varying thicknesses of the PCB, the cable connector, the cable assembly, etc. Further implementations could also only have a single groove in each of the arms 120 and 130.

Further, while the illustrated implementation shows the clamp member 110 with two arms and the frame 150 with two latching members, other implementations of the locking device 100 can have any suitable number of arms and latching members. In general, the clamp member 110 will include at least one arm with at least one clamp locking feature, and the frame 150 will include at least one latching member with at least one frame locking feature.

Although the disclosed embodiments have illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described been above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

What is claimed is:

1. A locking device for securing a cable assembly to a cable connector of a printed circuit board (PCB), the locking device comprising:

a clamp member that includes a baseplate and at least one arm extending from the baseplate, the at least one arm having a clamp locking feature;

a frame configured to fit over the clamp member, the frame including at least one latching member extending therefrom, the at least one latching member having a frame locking feature; and a boss extending from the at least one arm of the clamp member, the boss contacting the frame when the frame is fit over the clamp member to prevent the frame from sliding past the boss, wherein when the frame is fit over the clamp member, the at least one arm of the baseplate extends through an aperture defined in the frame such that the at least one arm is parallel to the at least one latching member of the frame, the clamp locking feature of the at least one arm being configured to mate with the frame locking feature of the at least one latching member to lock the frame to the clamp member.

2. The locking device of claim 1, wherein when the frame is locked to the clamp member, a gap is defined between the frame and the baseplate of the clamp member, the gap being sized to receive a portion of the cable assembly and a portion of the cable connector therein.

3. The locking device of claim 2, wherein the clamp member and the frame apply a compressive force to the portion of the cable assembly and the portion of the cable connector when the frame is locked to the clamp member, the compressive force preventing disconnection of the cable assembly from the cable connector.

4. The locking device of claim 3, wherein the frame further includes a compression member extending from an underside thereof, the compression member and the clamp member applying the compressive force to the portion of the cable assembly and the portion of the cable connector when the frame is locked to the clamp member.

5. The locking device of claim 1, wherein the clamp locking feature includes one or more grooves defined in the at least one arm, and wherein the frame locking feature includes one or more shoulders that extend from the at least one latching member toward the at least one arm when the frame is locked to the clamp member.

6. The locking device of claim 5, wherein the one or more shoulders are insertable into the one or more grooves when the frame is locked to the clamp member to thereby lock the frame to the clamp member.

7. The locking device of claim 6, wherein the one or more grooves includes a plurality of grooves, at least one of the one or more shoulders being selectively insertable into a respective groove of the plurality of grooves to adjust a height of a gap between the baseplate of the clamp and the frame.

8. The locking device of claim 6, wherein the at least one latching member is biased toward the at least one arm.

9. The locking device of claim 1, wherein a position of the boss along a length of the at least one arm defines a minimum height of a gap between the baseplate and an underside of the frame.

10. The locking device of claim 1, wherein the at least one arm includes a first arm and a second arm extending from opposite ends of the baseplate, each of the first arm and the second arm having the clamp locking feature, the at least one latching member including a first latching member and a second latching member, each of the first latching member and the second latching member having the frame locking feature.

11. The locking device of claim 10, wherein when the frame is fit over the clamp member, the first arm extends through a first aperture defined in the frame and the second arm extends through a second aperture in the frame such that the first latching member and the second latching member are positioned between the first arm and the second arm.

12. The locking device of claim 11, wherein the clamp locking feature of both the first arm and the second arm includes a plurality of grooves, the frame locking feature of the first latching member includes a first shoulder that is selectively insertable into the plurality of grooves of the first arm, and the frame locking feature of the second latching member includes a second shoulder that is selectively insertable into the plurality of grooves of the second arm.

13. A printed circuit board (PCB) assembly comprising:

a PCB;

a cable connector mounted on the PCB;

a cable assembly inserted into the cable connector; and a locking device for securing the cable assembly to the cable connector, the locking device including:

a clamp member that includes a baseplate disposed on a first side of the PCB, and first and second arms that extend through apertures in the PCB to an opposing second side of the PCB; and a frame disposed on the second side of the PCB, the frame having apertures defined therein through which the first arm and the second arm of the clamp member extend, the frame being lockable to the clamp member such that at least a portion of the cable assembly and a portion of the cable connector are positioned between the clamp member and the frame, the clamp member and the frame applying a compressive force to the portion of the cable assembly and the portion of the cable connector when the frame is locked to the clamp member, the compressive force preventing disconnection of the cable assembly from the cable connector;

wherein the frame includes a first latching member extending away from the second side of the PCB and being aligned with the first arm, and a second latching member extending away from the second side of the PCB and being aligned with the second arm, the first latching member and the second latching member being positioned between the first arm and the second arm.

14. The PCB assembly of claim 13, wherein the first arm and the second arm each include a plurality of grooves, the first latching member including a first shoulder extending toward and being selectively insertable into a respective groove of the plurality of grooves of the first arm, the second latching member including a second shoulder extending toward and being selectively insertable into the respective groove of the plurality of grooves of the second arm.

15. The PCB assembly of claim 14, wherein the plurality of grooves of the first arm and the second arm each includes a proximal groove that is nearer to the baseplate and a distal groove that is farther away from the baseplate, and wherein:

when the first shoulder is inserted into the proximal groove of the first arm and the second shoulder is inserted into the proximal groove of the second arm, a gap having a first height is defined between the baseplate and the frame; and when the first shoulder is inserted into the distal groove of the first arm and the second shoulder is inserted into the distal groove of the second arm, a gap having a second height is defined between the baseplate and the frame, the second height being greater than the first height.

16. The locking device of claim 13, wherein the frame further includes a compression member extending from an underside thereof, the compression member and the clamp applying the compressive force to the portion of the cable assembly and the portion of the cable connector when the frame is locked to the clamp member.

17. The PCB assembly of claim 13, wherein both the first arm and the second arm have a flared proximal end adjacent to the baseplate that is wider than the apertures defined in the PCB.

18. The PCB assembly of claim 17, wherein the flared proximal end of the first arm and the flared proximal end of the second arm contact the first side of the PCB prevent further insertion of the first arm and the second into the apertures of the PCB, so as to define a minimum distance between the baseplate and the first side of the PCB.

19. A locking device for securing a cable assembly to a cable connector of a printed circuit board (PCB), the locking device comprising:

a clamp member that includes a baseplate and at least one arm extending from the baseplate, the at least one arm having a clamp locking feature; and a frame configured to fit over the clamp member, the frame including at least one latching member extending therefrom, the at least one latching member having a frame locking feature, wherein when the frame is fit over the clamp member, the at least one arm of the baseplate extends through an aperture defined in the frame such that the at least one arm is parallel to the at least one latching member of the frame, the clamp locking feature of the at least one arm being configured to mate with the frame locking feature of the at least one latching member to lock the frame to the clamp member, wherein the clamp locking feature includes one or more grooves defined in the at least one arm, and wherein the frame locking feature includes one or more shoulders that extend from the at least one latching member toward the at least one arm when the frame is locked to the clamp member, wherein the one or more shoulders are insertable into the one or more grooves when the frame is locked to the clamp member to thereby lock the frame to the clamp member, and wherein the one or more grooves includes a plurality of grooves, at least one of the one or more shoulders being selectively insertable into a respective groove of the plurality of grooves to adjust a height of a gap between the baseplate of the clamp and the frame.

20. A locking device for securing a cable assembly to a cable connector of a printed circuit board (PCB), the locking device comprising:

a clamp member that includes a baseplate and at least one arm extending from the baseplate, the at least one arm having a clamp locking feature; and a frame configured to fit over the clamp member, the frame including at least one latching member extending therefrom, the at least one latching member having a frame locking feature, wherein when the frame is fit over the clamp member, the at least one arm of the baseplate extends through an aperture defined in the frame such that the at least one arm is parallel to the at least one latching member of the frame, the clamp locking feature of the at least one arm being configured to mate with the frame locking feature of the at least one latching member to lock the frame to the clamp member, wherein the at least one arm includes a first arm and a second arm extending from opposite ends of the baseplate, each of the first arm and the second arm having a clamp locking feature, the at least one latching member including a first latching member and a second latching member, each of the first latching member and the second latching member having a frame locking feature, and wherein when the frame is fit over the clamp member, the first arm extends through a first aperture defined in the frame and the second arm extends through a second aperture in the frame such that the first latching member and the second latching member are positioned between the first arm and the second arm.

21. A printed circuit board (PCB) assembly comprising:

a PCB;

a cable connector mounted on the PCB;

a cable assembly inserted into the cable connector; and a locking device for securing the cable assembly to the cable connector, the locking device including:

a clamp member that includes a baseplate disposed on a first side of the PCB, and first and second arms that extend through apertures in the PCB to an opposing second side of the PCB; and a frame disposed on the second side of the PCB, the frame having apertures defined therein through which the first arm and the second arm of the clamp member extend, the frame being lockable to the clamp member such that at least a portion of the cable assembly and a portion of the cable connector are positioned between the clamp member and the frame, the clamp member and the frame applying a compressive force to the portion of the cable assembly and the portion of the cable connector when the frame is locked to the clamp member, the compressive force preventing disconnection of the cable assembly from the cable connector;

wherein both the first arm and the second arm have a flared proximal end adjacent to the baseplate that is wider than the apertures defined in the PCB.

22. A locking device for securing a cable assembly to a cable connector of a printed circuit board (PCB), the locking device comprising:

a clamp member that includes a baseplate and at least one arm extending from the baseplate;

a frame configured to fit over the clamp member, the frame including at least one latching member extending therefrom; and a boss extending from the at least one arm of the clamp member, the boss contacting the frame when the frame is fit over the clamp member to prevent the frame from sliding past the boss, wherein when the frame is fit over the clamp member, the at least one arm of the baseplate extends through an aperture defined in the frame such that the at least one arm is parallel to the at least one latching member of the frame, wherein the at least one arm includes a first arm and a second arm extending from opposite ends of the baseplate, each of the first arm and the second arm having a clamp locking feature, and wherein when the frame is fit over the clamp member, the first arm extends through a first aperture defined in the frame and the second arm extends through a second aperture in the frame.

* * * * *